United States Patent
Chmielewski

(10) Patent No.: US 9,177,213 B2
(45) Date of Patent: Nov. 3, 2015

(54) METHOD AND APPARATUS FOR USE IN FORMING AN IMAGE

(75) Inventor: Radoslaw Pawel Chmielewski, Lodz (PL)

(73) Assignee: TomTom Polska Sp. Z o.o., Warsaw (PL)

(*) Notice: Subject to any disclaimer, the term of this patent is extended or adjusted under 35 U.S.C. 154(b) by 59 days.

(21) Appl. No.: 13/977,788

(22) PCT Filed: Dec. 29, 2010

(86) PCT No.: PCT/EP2010/070893
§ 371 (c)(1),
(2), (4) Date: Sep. 30, 2013

(87) PCT Pub. No.: WO2012/089259
PCT Pub. Date: Jul. 5, 2012

(65) Prior Publication Data
US 2014/0029802 A1    Jan. 30, 2014

(51) Int. Cl.
*G06K 9/00* (2006.01)
*G08G 1/16* (2006.01)

(52) U.S. Cl.
CPC ........ *G06K 9/00798* (2013.01); *G06K 9/00791* (2013.01); *G08G 1/163* (2013.01)

(58) Field of Classification Search
CPC   G06K 9/00791; G06K 9/00798; G08G 1/163
See application file for complete search history.

(56) References Cited

U.S. PATENT DOCUMENTS

| | | | |
|---|---|---|---|
| 7,835,854 B2* | 11/2010 | Yamamoto et al. | 701/117 |
| 7,881,839 B2* | 2/2011 | Stam et al. | 701/36 |
| 8,094,970 B2* | 1/2012 | Nakanishi et al. | 382/284 |
| 8,462,988 B2* | 6/2013 | Boon | 382/104 |
| 2003/0209893 A1 | 11/2003 | Breed et al. | |
| 2009/0033540 A1 | 2/2009 | Breed et al. | |

OTHER PUBLICATIONS

Tsogas M et al: "Combined lane and road attributes extraction by fusing data from digital map, laser scanner and camera" Information Fusion, Elsevier, US, vol. 12, No. 1, Jan. 18, 2010. pp. 28-36, XP027298786, ISSN: 1566-2535 [retrieved on Jan. 18, 2010].

(Continued)

*Primary Examiner* — Tom Y Lu

(57) ABSTRACT

A method for use in forming an image of an object comprises setting a value of an attribute of an image of an object according to a measured reflectance of the object. The image of the object thus formed may be realistic and may closely resemble the actual real-world appearance of the object. Such a method may, in particular, though not exclusively, be useful for providing a realistic image of a road surface and any road markings thereon to assist with navigation. Setting a value of an attribute of the image of the object may comprise generating an initial image of the object and adjusting a value of an attribute of the initial image of the object according to the measured reflectance of the object to form an enhanced image of the object. A method for use in navigation comprises providing a navigation system with data associated with an image formed using such a method. An image formed using such a method and a map database containing such an image are also disclosed.

16 Claims, 9 Drawing Sheets

(56) References Cited

OTHER PUBLICATIONS

Sparbert J et al: "Lane detection and street type classification using laser range images". Intelligent Transportation Systems, 2001, Proceedings. 2001 IEEE Aug. 25-29, 2001, Piscataway, NJ, USA, IEEE, Aug. 25, 2001, pp. 454-459, XP010555814, ISBN: 978-0-7803-7194-1.

Ljubo Vlacic et al: "Intelligent Vehicle Technologies: Theory and Applications (Automotive Engineering Series)". Intelligent Vehicle Technologies: Theory and Applications (Automotive Engineering Series), Jan. 6, 2002, pp. 85-170, XP55009992, ISBN: 978-0-75-065093-9 [retrieved on Oct. 19, 2011].

Fardi B et al: "Multi modal detection and parameter-based tracking of road borders with a laser scanner". Intelligent Vehicles Symposium, 2003, Proceedings. IEEE Jun. 9-11, 2003, Piscataway, NJ, USA, IEEE, Jun. 9, 2003, pp. 95-99, XP010645856, ISBN: 978-0-7803-7848-3.

International Search Report issued Oct. 28, 2011 for International Application No. PCT/EP2010/070893.

\* cited by examiner

METHOD AND APPARATUS FOR USE IN FORMING AN IMAGE

CROSS-REFERENCES TO RELATED APPLICATIONS

This application is the National Stage of International Application No. PCT/EP2010/070893 filed Dec. 29, 2010 and designating the United States. The entire content of this application is incorporated herein by reference.

FIELD

The present invention relates to a method for use in forming an image of an object and, in particular, though not exclusively, for use in providing a realistic image of a road surface and any road markings thereon to assist with navigation. The present invention also concerns an image formed using such a method, a method for use in navigation and a map database.

BACKGROUND

Known satellite navigation devices may display an image to a user according to a position of the user as determined by at least one of a satellite navigation system receiver such as a Global Positioning System (GPS) or a Galileo receiver, a Distance Measurement Instrument (DMI) and an Inertial Measurement Unit (IMU). The image displayed to the user is generally selected from a map database according to the determined position of the user. The map database is generally stored locally within the satellite navigation device but may be stored remotely from the satellite navigation device.

The image displayed to the user may be artificially generated and may have an appearance which does not closely resemble the environment around the satellite navigation device which it represents. In particular, in the context of vehicle navigation systems, the image displayed to the user may not show road markings. A known solution to this problem is to capture images of the environment and store the captured images in a map database. The images of the environment around the satellite navigation device are selected from the map database according to the determined position of the user and are displayed to the user. One problem with such known methods is that capturing images of the environment is time consuming and costly. Furthermore, storing the captured images may require the storage of large quantities of data. In addition, the captured images often have noise and/or unwanted obstructions such as vehicles, pedestrians and the like which may be distracting when displayed to the user of the satellite navigation device.

SUMMARY

According to a first aspect of the present invention there is provided a method for use in forming an image of an object comprising:

setting a value of an attribute of an image of an object according to a measured reflectance of the object.

The image of the object thus formed may be realistic and may closely resemble the actual real-world appearance of the object.

The object may comprise a surface feature. For example, the object may comprise a surface having a variation in appearance across the surface.

The object may comprise a surface having a variation in texture.

The object may comprise a surface having a variation in profile.

The object may comprise a surface having a variation in colour.

The object may comprise a surface having a painted portion.

The object may comprise a surface having a raised portion.

The object may comprise a surface having a smooth portion.

The object may comprise a surface having a marking formed thereon.

The object may comprise a surface having a graphic symbol formed thereon.

The object may comprise a surface having text formed thereon.

The object may, for example, comprise an object in an environment associated with vehicle traffic.

The object may, for example, comprise a surface for vehicular traffic such as a road or a road-side surface such as a footpath, pavement, sidewalk, curb or the like.

The object may comprise a road marking.

The method may be particularly useful for providing a realistic image of a road surface and, in particular, a realistic image of any road markings on the road surface from actual reflectance data measured from the road surface. Such images may be generated automatically from measured reflectance values without having to use images captured using a camera which often have noise and/or unwanted obstructions such as vehicles, pedestrians and the like. The image may be displayed to a user of a navigation system such as a satellite navigation system to provide realistic road surface information and assist with navigation. Such a method may also be useful for providing a realistic image of a road-side surface and of any markings on the road-side surface from actual reflectance values measured from the road-side surface.

The object may comprise a surface line marking such as a broken line or a solid line or the like.

The object may comprise at least one of a traffic lane surface marking, a surface marking designating a central reservation or a hard shoulder, a stop line surface marking, a yield line surface marking, a surface marking designating an interchange, a surface marking designating a parking space for vehicles.

The object may comprise a surface marking indicating vehicle parking restrictions.

The object may comprise at least one of a surface marking indicating a pedestrian path, pedestrian crossing, zebra crossing and the like.

The object may comprise at least one of a surface marking indicating a cycle lane, cycle crossing and the like.

The object may comprise infrastructure in a road-side environment. For example, the object may comprise infrastructure visible from a road.

The object may comprise a road-side structure. For example, the object may comprise a road-side building, traffic sign, traffic signal, traffic light, lamp post, street light, telegraph pole, pylon, mast, billboard or the like.

The attribute of the image of the object may comprise a brightness, lightness, intensity, saturation, contrast and the like of the image. For example, the attribute may comprise a grayscale intensity value of the image.

The attribute of the image of the object may comprise at least one of a hue or colour of the image.

The method may comprise setting a value of a plurality of attributes of the image of the object according to a measured reflectance of the object.

Setting a value of an attribute of the image of the object may comprise generating an initial image of the object and adjusting a value of an attribute of the initial image of the object according to the measured reflectance of the object to form an enhanced image of the object.

The method may comprise associating a pixel, point or portion of the initial image of the object with a corresponding position on a surface of the object from which the reflectance is measured.

The method may comprise adjusting at least one attribute of the pixel, point or portion of the initial image of the object according to the measured reflectance of the object. For example, the method may comprise adjusting at least one of a brightness, lightness, intensity, saturation, contrast and the like of the associated pixel, point or portion of the initial image according to the measured reflectance. For example, the method may comprise adjusting a grayscale intensity value of the associated pixel, point or portion of the initial image according to the measured reflectance.

The method may comprise adjusting at least one attribute of the pixel, point or portion of the initial image of the object according to an increasing function of the measured reflectance of the object.

Such a method may permit realistic object reflectance data to be superimposed or projected upon the initial image of the object. Such a method may, for example, ensure that an associated pixel, point or portion of the enhanced image which corresponds to a smoother white or yellow road marking has a higher intensity value than an associated pixel, point or portion of the image which corresponds to a position elsewhere on the road surface because the reflectance measured from the position on the road marking is greater than the reflectance measured from a position elsewhere on the road surface.

The method may comprise comparing a measured reflectance value of the object to a predetermined threshold reflectance value and adjusting the initial image of the object according to whether the measured reflectance value is greater than, equal to or less than the predetermined threshold reflectance value. For example, where the measured reflectance value of the object is greater than or equal to the predetermined threshold reflectance value because the reflectance is measured from a position of a road surface having a smooth white or yellow road marking, the method may comprise setting an intensity of the associated pixel, point or portion of the enhanced image to a predetermined higher value. Such a thresholding method may provide a clearer enhancement of any object markings such as road markings.

The method may comprise adjusting a colour and/or a hue or the like of an associated pixel, point or portion of an initial image of the object according to the measured reflectance from the object.

The method may comprise measuring a reflectance of the object.

The method may comprise measuring a reflectance from a position on a surface of the object.

The method may comprise remotely measuring the reflectance of the object using a remote reflectance measurement device.

The method may comprise remotely measuring the reflectance of the object using a laser reflectance measurement device.

The method may comprise generating a laser beam and directing the laser beam onto the object.

The method may comprise receiving at least a portion of the laser beam returned from the object.

The method may comprise receiving at least a portion of the laser beam reflected from the object.

The method may comprise receiving at least a portion of the laser beam scattered from the object.

The method may comprise determining the reflectance of the object according to a proportion of the power of the incident laser beam returned from the object.

The method may comprise measuring a distance to the object. For example, the method may comprise using a laser rangefinder to measure the distance from the laser rangefinder to the object. The laser rangefinder apparatus may, for example, comprise a time-of-flight laser rangefinder.

The method may comprise determining a position and orientation of a device used to measure a distance to the object. The method may comprise using at least one of a satellite navigation receiver, a Distance Measurement Instrument (DMI) and an Inertial Measurement Unit (IMU). The method may comprise using at least one of a Global Positioning System (GPS) receiver, a Differential Global Positioning System (DGPS) receiver and a Galileo receiver.

The method may comprise measuring the reflectance of the object, measuring a distance to the object and determining a position and orientation of a remote reflectance measurement device simultaneously or substantially simultaneously.

The method may comprise determining a time of measurement of the reflectance value.

The method may comprise determining a time of measurement of the distance to the object.

The method may comprise determining a time of measurement of the position and orientation of the remote reflectance measurement device.

Such a step may permit a reflectance value from the object, a measured distance to the object and the position and orientation of the remote reflectance measurement device to be time-stamped for post-processing.

The method may comprise storing the measured reflectance from the object, the measured distance to the object, the position and orientation of the remote reflectance measurement device and the time of measurement.

The method may comprise determining a position on a surface of the object from which a reflectance value is measured.

The method may comprise determining a position of incidence of a laser beam on the object.

The method may comprise determining an axis of travel of a laser beam generated using a laser reflectance measurement device relative to the laser reflectance measurement device.

The method may comprise determining a position of incidence of the laser beam on the object from the position and orientation of the laser reflectance measurement device, the axis of travel of the laser beam relative to the laser reflectance measurement device and the measured distance from the laser reflectance measurement device to the object.

The method may comprise measuring the reflectance of the object at a plurality of different positions on a surface of the object.

The method may comprise using a laser scanner such as a 2D or a 3D laser scanner to measure reflectance of the object at a plurality of positions on a surface of the object.

The method may comprise providing an initial image of the object.

The method may comprise artificially generating an initial image of the object according to a function of the object. For example, where the object comprises a road surface, the method may comprise artificially generating a generic image of a road surface as the initial image which has an appearance of a material which is commonly used for road surfaces such as asphalt, tarmac, concrete or the like. Where the object comprises a pavement, the method may comprise artificially generating a generic pavement surface as the initial image which has an appearance of a material which is commonly used for pavement surfaces such as paving slabs, stones, concrete or the like.

The method may comprise capturing an image of the object.

The method may comprise capturing an image of the object using an image capture device.

The method may comprise measuring a position and orientation of the image capture device. The method may comprise using at least one of a satellite navigation receiver, a Distance Measurement Instrument (DMI) and an Inertial Measurement Unit (IMU). The method may comprise using at least one of a Global Positioning System (GPS) receiver, a Differential Global Positioning System (DGPS) receiver and a Galileo receiver.

The method may comprise selecting a portion of the captured image of the object.

The method may comprise constructing the initial image of the object from the selected portion of the captured image of the object.

The method may comprise replicating the portion of the captured image to form a plurality of image portions.

The method may comprise selecting a plurality of portions of the captured image to form a plurality of image portions.

The method may comprise capturing a plurality of image portions of the object, each image portion corresponding to a different portion of the object.

The method may comprise constructing the initial image of the object from the plurality of image portions.

The method may comprise arranging the plurality of image portions to construct the initial image of the object. For example, the method may comprise translating and/or orienting the plurality of image portions relative to one another to construct the initial image of the object.

The method may comprise arranging the plurality of image portions adjacent to one another to construct the initial image of the object.

The method may comprise tiling the plurality of image portions to construct the initial image of the object.

The method may comprise overlapping the plurality of image portions to construct the initial image of the object.

The method may comprise joining, matching or stitching the plurality of image portions to construct the initial image of the object.

According to a second aspect of the present invention there is provided an image of an object formed by:

setting a value of an attribute of an image of an object according to a measured reflectance of the object.

It should be understood that one or more of the optional features associated with the first aspect of the present invention may apply either alone or in any combination in relation to the second aspect of the present invention.

Setting a value of an attribute of the image of the object may comprise generating an initial image of the object and adjusting a value of an attribute of the initial image of the object according to the measured reflectance of the object to form an enhanced image of the object.

According to a third aspect of the present invention there is provided a method for use in navigation comprising:

providing a navigation system with data associated with an image of an object, the image being formed by setting a value of an attribute of an image of the object according to a measured reflectance of the object.

It should be understood that one or more of the optional features associated with the first aspect of the present invention may apply either alone or in any combination in relation to the third aspect of the present invention.

Setting a value of an attribute of the image of the object may comprise generating an initial image of the object and adjusting a value of an attribute of the initial image of the object according to the measured reflectance of the object to form an enhanced image of the object.

The method may comprise displaying the image of the object.

The method may comprise displaying the image of the object to a user of a navigation system such as a satellite navigation system to provide realistic object information and assist with navigation.

The method may comprise measuring the reflectance of the object.

The method may comprise measuring a reflectance of each of the plurality of objects.

The method may comprise providing the initial image of the object.

The method may comprise providing a plurality of initial images of a plurality of objects.

The method may comprise providing a navigation system with a plurality of images of a plurality of objects, the images being formed by setting a value of an attribute of a plurality of images of the plurality of objects according to a measured reflectance from each object.

The method may comprise determining the position of a user. For example, the method may comprise determining a position of a user using at least one of a satellite navigation system receiver, a Distance Measurement Instrument (DMI) and an Inertial Measurement Unit (IMU). The method may comprise using at least one of a Global Positioning System (GPS) receiver, a Differential Global Positioning System (DGPS) receiver and a Galileo receiver.

The method may comprise selecting one or more of the plurality of the images of a plurality of objects according to the determined position of the user.

The method may comprise displaying the one or more selected images.

According to a fourth aspect of the present invention there is provided an apparatus for use in forming an image of an object comprising:

a processor configured to set a value of an attribute of an image of an object according to a measured reflectance of the object.

It should be understood that one or more of the optional features associated with the first aspect of the present invention may apply either alone or in any combination in relation to the fourth aspect of the present invention.

The apparatus may comprise a vehicle such as a survey vehicle or a mobile mapping vehicle.

The processor may be located in the vehicle.

The processor may be located remotely from the vehicle.

The processor may be configured to process measurement data in real-time.

The processor may be configured to post-process measurement data.

The apparatus may comprise a memory. The memory may be configured for communication with the processor. The memory may be configured to store data associated with the enhanced image.

The memory may comprise a hard-disk, solid state memory, RAM, ROM, EEPROM, flash memory or the like.

The memory may be located in the vehicle. In such an arrangement, data associated with the enhanced image may be stored in the memory and transferred to a central storage location after completion of a survey, for example by connecting the memory to the central storage location.

The memory may be located remotely from the vehicle. In such an arrangement, data associated with the adjusted image may be transmitted to the memory either during a survey or after completion of a survey.

The memory may comprise a removable storage medium such as a portable hard-disk, flash memory device or a data carrier such as a CD ROM, a CD-R, a CD-RW, a DVD, a DVD-R or a DVD-RW or the like.

The apparatus may comprise a transceiver configured for communication with a communication network such as the Public Switched Telephone Network (PSTN), a cellular network, a satellite network, a Local Area Network (LAN), a Wide Area Network (WAN), a Wi-Fi network, the internet or the like. The transceiver may be configured for wireless or wireline communication. The transceiver may be configured for radio communication or the like.

The transceiver may be configured for communication with the processor. The transceiver may be configured to transmit unprocessed measurement data or processed data associated with the enhanced image to a remote receiver.

The processor may be configured to set a value of an attribute of the image of the object by generating an initial image of the object and adjusting a value of an attribute of the initial image of the object according to the measured reflectance of the object to form an enhanced image of the object.

The processor may be configured to artificially generate the initial image of the object.

The apparatus may comprise an image capture device for capturing an image of the object. For example, the apparatus may comprise an image sensor or a camera such as a digital camera, a video camera or the like.

The processor may be configured to generate the initial image of the object from at least a portion of an image of the object captured by the image capture device.

The image capture device may be configured for communication with the processor.

The image capture device may be attached to the vehicle, for example, mounted on a roof of the vehicle.

The image capture device may be configured to provide an image of the object when the object is located generally rearwardly and/or forwardly of the vehicle. For example, the image capture device may be generally facing in a direction opposite to a direction of travel of the vehicle or in the direction of travel of the vehicle.

The apparatus may comprise a reflectance measurement device for measuring a reflectance of the object.

The reflectance measurement device may be configured for communication with the processor.

The reflectance measurement device may comprise a laser rangefinder such as a time-of-flight laser rangefinder.

The reflectance measurement device may comprise a laser rangefinder which is configured to measure a distance to a surface of the object.

The reflectance measurement device may comprise a laser rangefinder which is configured to measure a distance to a surface of the object at a plurality of positions on the surface of the object.

The reflectance measurement device may comprise a laser scanner such as a 2D or 3D laser scanner.

The apparatus may comprise a plurality of laser scanners.

The reflectance measurement device may be attached to the vehicle, for example, mounted on a roof of the vehicle.

The reflectance measurement device may be configured to measure the reflectance of the object when the object is located generally rearwardly or forwardly of the vehicle. For example, the reflectance measurement device may be generally facing in a direction opposite to a direction of travel of the vehicle or in the direction of travel of the vehicle.

The apparatus may comprise a device for determining position and orientation. For example, the apparatus may comprise at least one of a satellite navigation system receiver, a Distance Measurement Instrument (DMI) and an Inertial Measurement Unit (IMU). The apparatus may comprise at least one of a Global Positioning System (GPS) receiver, a Differential Global Positioning System (DGPS) receiver and a Galileo receiver. The device for determining position and orientation may be configured for communication with the processor.

According to a fifth aspect of the present invention there is provided an apparatus for use in forming an image of an object comprising:

a means for setting a value of an attribute of an image of an object according to a measured reflectance of the object.

It should be understood that one or more of the optional features associated with the first aspect of the present invention may apply either alone or in any combination in relation to the fifth aspect of the present invention.

According to a sixth aspect of the present invention there is provided a map database comprising:

data associated with an image of an object, the image being formed by setting a value of an attribute of an image of the object according to a measured reflectance of the object.

It should be understood that one or more of the optional features associated with the first aspect of the present invention may apply either alone or in any combination in relation to the sixth aspect of the present invention.

Setting a value of an attribute of the image of the object may comprise generating an initial image of the object and adjusting a value of an attribute of the initial image of the object according to the measured reflectance of the object to form an enhanced image of the object.

The map database may be part of a navigation system such as a satellite navigation system.

The map database may be remote from a navigation system but configured for communication with the navigation system.

BRIEF DESCRIPTION OF THE DRAWINGS

The present invention will now be described by way of non-limiting example only with reference to the drawings of which.

DETAILED DESCRIPTION OF THE DRAWINGS

Figure 1:
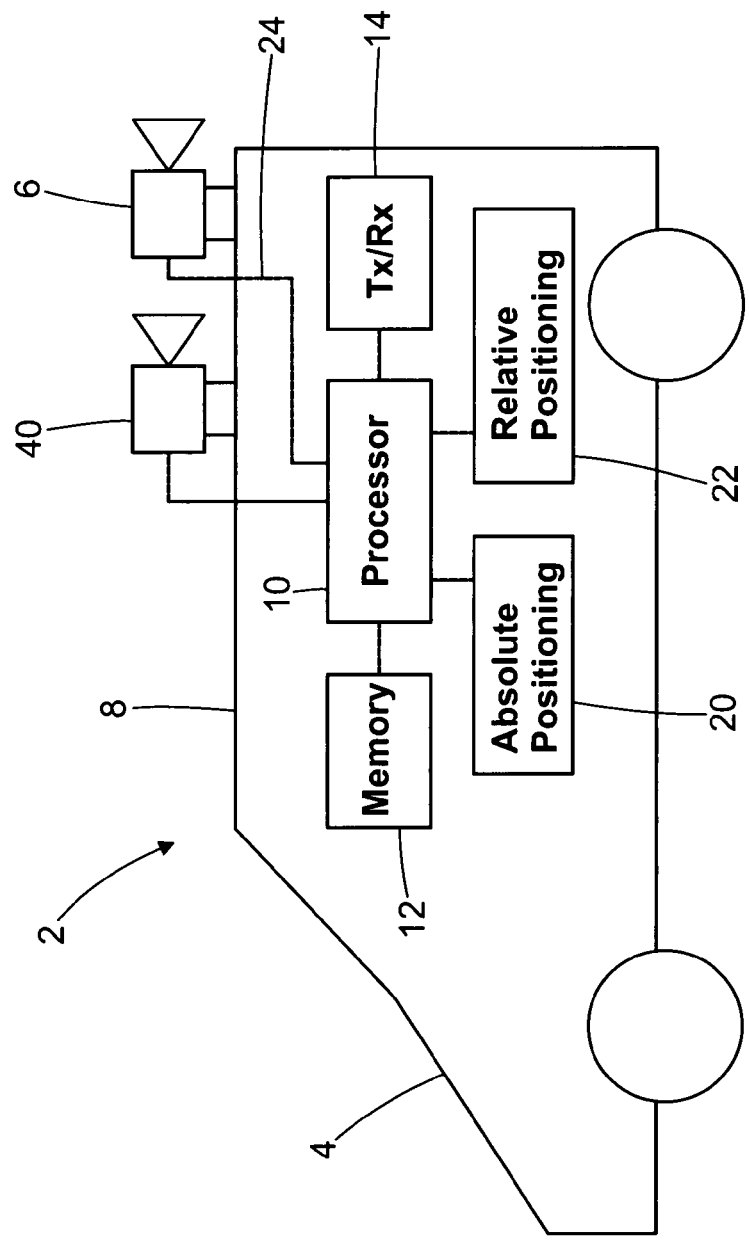
FIG. 1 is a schematic of a mobile mapping vehicle.

Referring initially to FIG. 1 there is provided a survey or mobile mapping system generally designated 2. The mobile mapping system 2 comprises a survey vehicle 4 and a reflectance measurement device in the form of a 3D laser scanner 6. The laser scanner 6 is configured to scan a laser beam in 3D across a surface of an object in 1° increments and to measure the proportion of the laser beam returned from the object for each laser beam direction. The laser scanner 6 can alternatively be configured to scan the laser beam in increments of any desired angle. This results in a 2D array of reflectance values with each reflectance value corresponding to a different laser beam direction in 3D space. The laser scanner 6 is configured such that an axis along which the laser beam is projected is known at any instant in time. The laser scanner 6 is also configured as a time-of-flight laser rangefinder so as to measure a distance to each position of incidence of the laser beam on the object surface. The laser scanner 6 is mounted on a roof 8 of the survey vehicle 4 facing in a generally rearward direction. The position and orientation of the laser scanner 6 are known with respect to the vehicle.

The survey vehicle 2 further comprises a processor 10, a memory 12 and a transceiver 14. In addition, the survey vehicle 2 comprises an absolute positioning device 20 having a GPS or a Galileo satellite navigation receiver and a relative positioning device 22 having an Inertial Measurement Unit (IMU) and a Distance Measurement Instrument (DMI). The absolute positioning device 20 may provide global co-ordinates of the vehicle. The relative positioning device 22 may serve to enhance the accuracy of the global co-ordinates measured by the absolute positioning device 20. As indicated by the dotted lines 24, the laser scanner 6, the memory 12, the transceiver 14, the absolute positioning device 20 and the relative positioning device 22 are all configured for communication with the processor 10.

Figure 2:
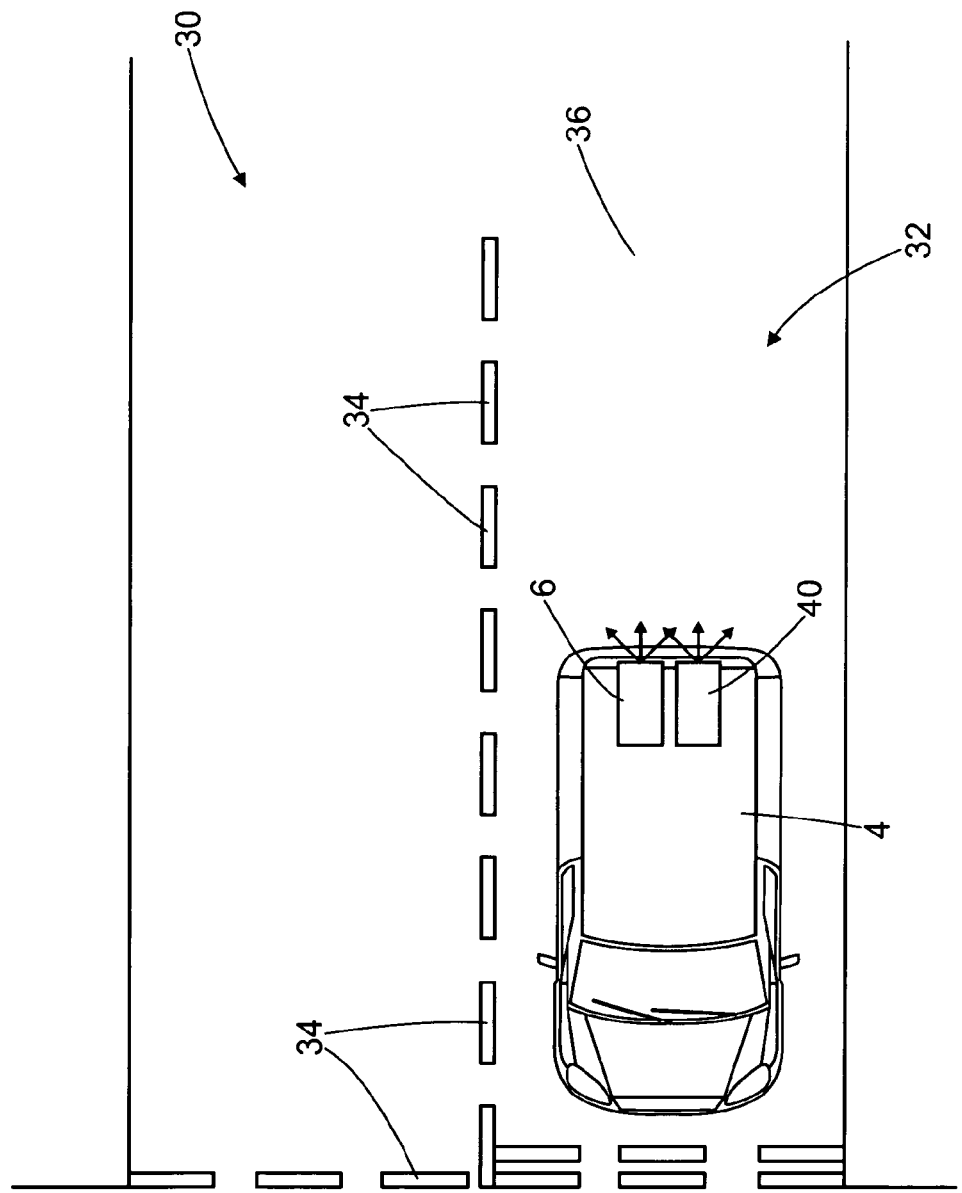
FIG. 2 schematically illustrates the mobile mapping vehicle of FIG. 1 in use.

In use, as shown in FIG. 2, the survey vehicle 4 travels along a road 30 comprising a surface 32 having road markings 34 painted thereon. Typically, the surface 32 may be formed of asphalt, tarmac or the like. Thus, in areas 36 outside the road markings 34, the surface 32 has a relatively dark, relatively rough texture. The road markings 32 are typically formed by painting the surface 32 white or yellow so as to provide areas having a relatively light, relatively smooth texture to provide a contrast in appearance with the other areas 36 of the surface 32.

As the survey vehicle 4 travels along the road 30, the laser scanner 6 repeatedly scans the surface 32 to provide a 2D array of measured reflectance values and a corresponding plurality of measured distance values. The processor 10 time-stamps each measured reflectance value and each measured distance value and stores them in the memory 12 for post-processing.

The processor 10 determines the position and the orientation of the vehicle 4 at any instant of time from position and orientation data measured using the absolute positioning device 20 and the relative positioning device 22. The processor 10 time-stamps the position and the orientation of the vehicle 4 and stores them in the memory 12 for post-processing.

Figure 3:
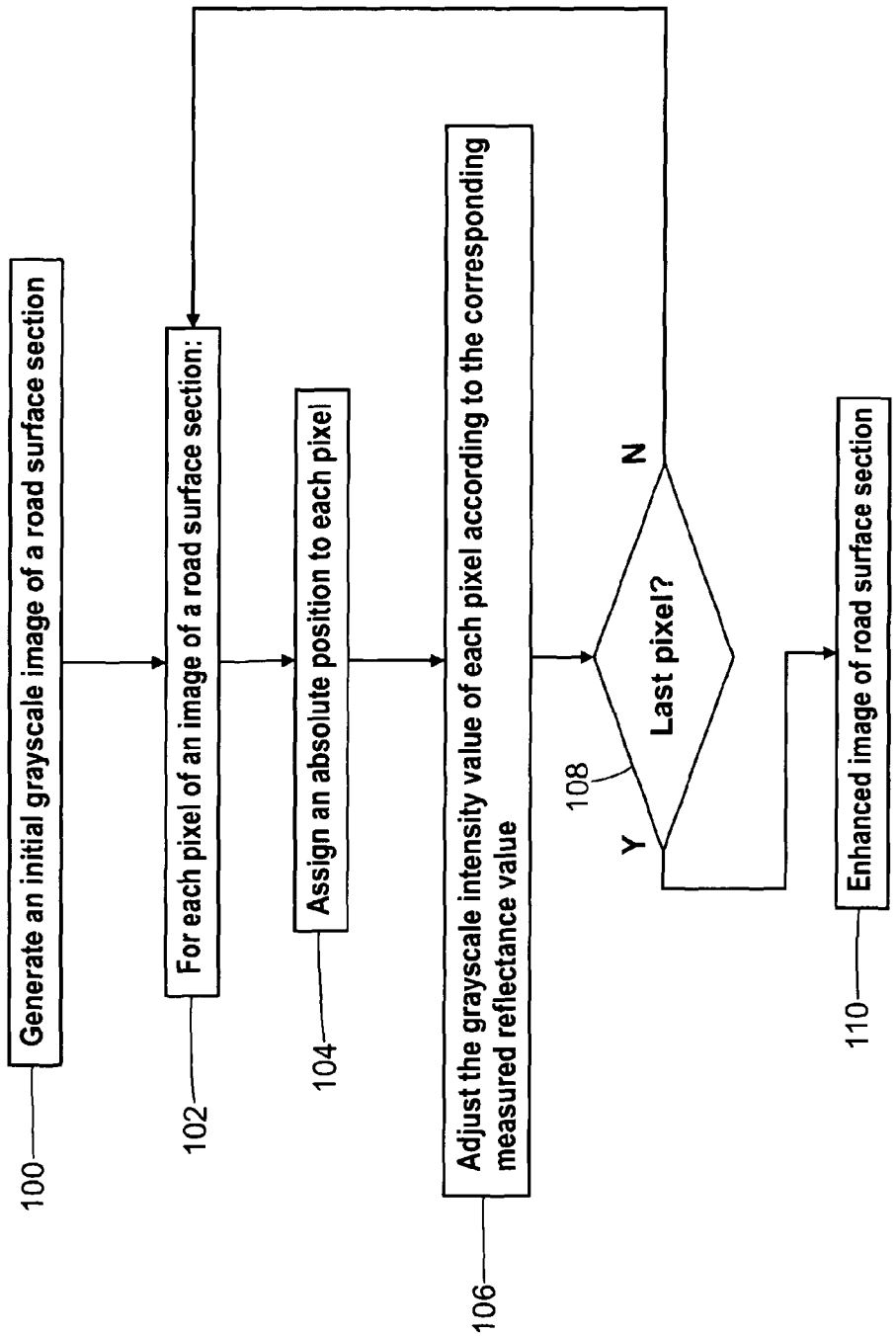
FIG. 3 is a flow chart illustrating a method constituting an embodiment of the present invention.

FIG. 3 illustrates a method of post-processing the measured data stored in the memory 12. The processor 10 performs all of the steps 100 to 110 shown in FIG. 3, for example, according to instructions provided to the processor 10. The method begins at step 100 at which the processor 10 generates an initial grayscale image of a section of the road surface 32 comprising 2D array of pixels wherein each pixel has a corresponding grayscale intensity value. The initial grayscale intensity values may be artificially generated by the processor 10 so as to be equal or may be artificially generated by the processor 10 so as to provide a road surface appearance which resembles asphalt, tarmac or the like.

At step 102, the processor 10 initiates a loop counter. For each pixel of the initial grayscale image of the section of the road surface 32, steps 104 and 106 are performed.

Step 104 comprises assigning an absolute position to each pixel of the initial grayscale image of the section of the road surface 32. In effect, therefore, step 104 comprises the construction of a model of the section of the road surface 32 and the corresponding measured reflectance data in the same 3D co-ordinate system. Where the size of the 2D array of pixels is equal to the size of the 2D array of measured reflectance values, the processor 10 assigns an absolute position to each pixel which corresponds to an measured absolute position of the road surface 32 which is determined from the data measured by the laser scanner 6 as will now be described. The processor 10 determines the absolute position and orientation of the laser scanner 6 at any instant in time from the measured position and orientation of the vehicle 4 and the known position and orientation of the laser scanner 6 with respect to the vehicle. The processor 10 then determines the absolute position of the position of incidence of the laser beam on the surface 32 at any instant in time from the absolute position and orientation of the laser scanner 6, the known laser beam axis, and the distance to the position of incidence on the surface 32 as measured using the laser scanner 6. Where the size of the 2D array of pixels of the initial grayscale image is different to the size of the 2D array of measured reflectance values, the processor 10 may interpolate the reflectance and distance data measured by the laser scanner 6 and the measured absolute position data of the laser scanner 6.

At step 106, the processor 10 adjusts the grayscale intensity value of each pixel of the initial grayscale image of the section of the road surface 32 according to the corresponding measured reflectance value. More specifically, the processor 10 determines the grayscale intensity value for each pixel according to an increasing function of the corresponding measured reflectance value. The resulting image of the section of the road surface 32 is provided at step 110. The image of the section of the road surface 32 provided at step 110 is constructed using real-world measured reflectance data and therefore appears more realistic than an image which is generated without using real-world data. In addition, the image of the section of the road surface 32 provided at step 110 automatically shows road markings without having to use images captured using a camera which often have noise and/or unwanted obstructions such as vehicles, pedestrians and the like.

Figure 4:
FIG. 4 is an image of a road section.
Figure 5:
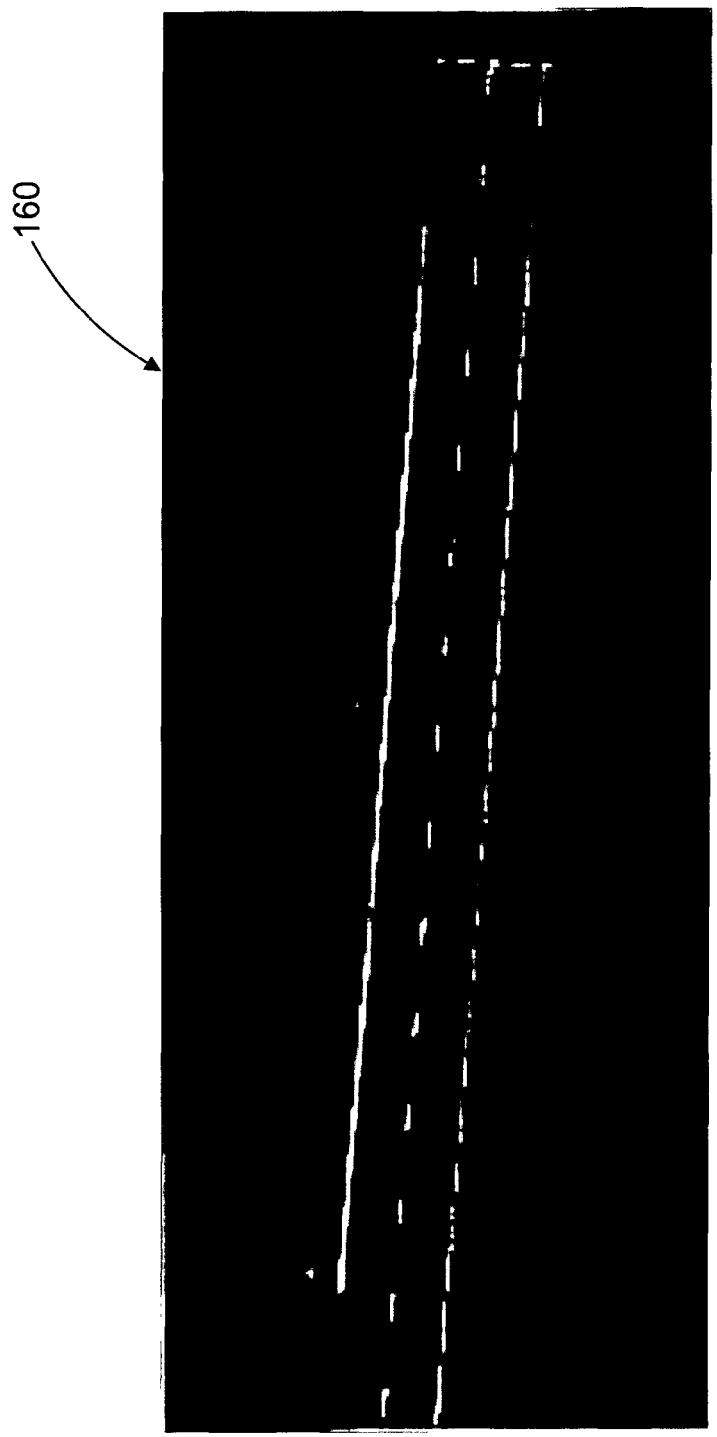
FIG. 5 is a spatially accurate representation of measured reflectance data corresponding to the road section image of FIG. 4.
Figure 6:
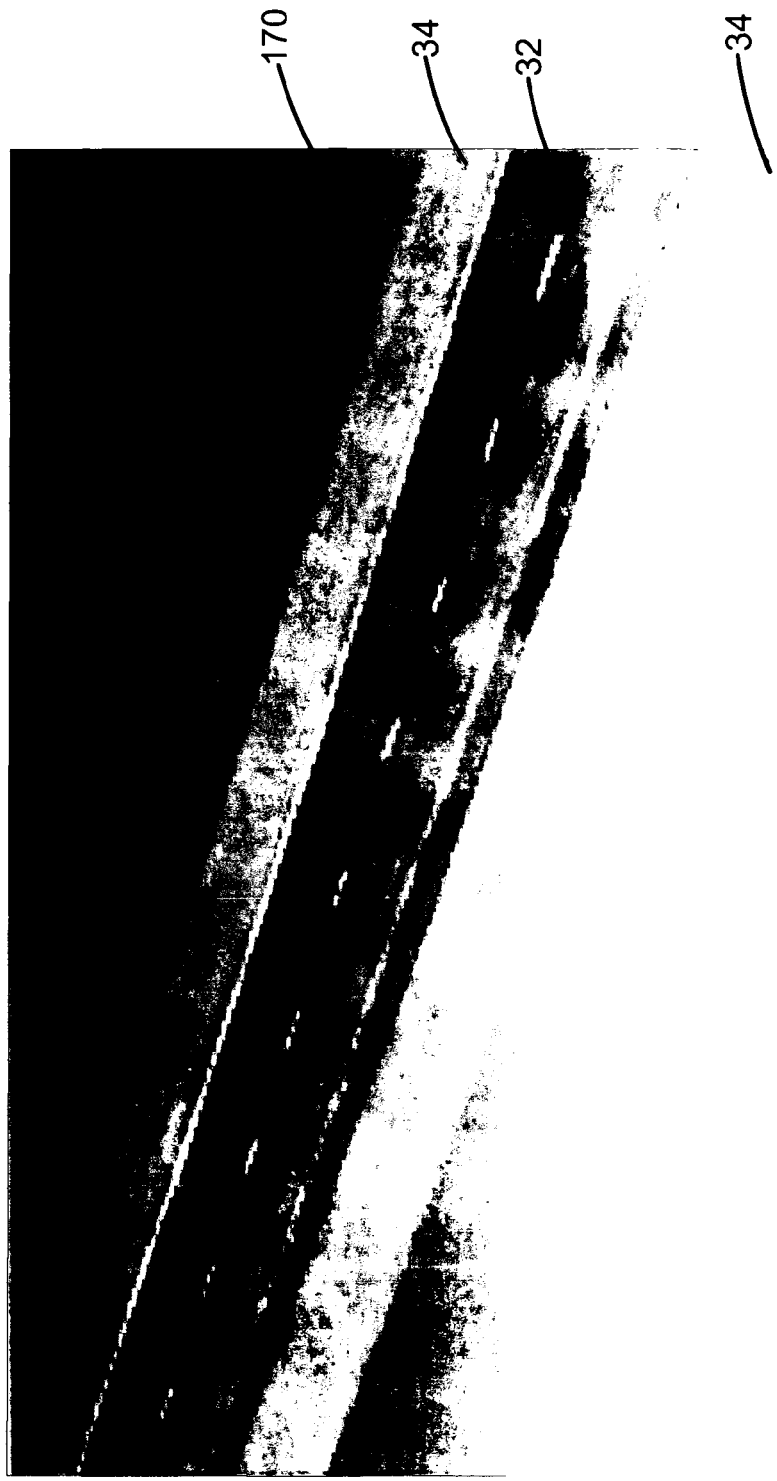
FIG. 6 shows a road section image after adjustment according to the measured reflectance data of FIG. 5.

Images of a section of the road surface 32 corresponding to different steps in the method of FIG. 3 are shown in FIGS. 4, 5 and 6. FIG. 4 shows an initial image 150 of the section of the road surface 32 artificially generated by the processor 10 to have a road surface appearance which resembles asphalt. In addition to the section of the road surface 32, a pavement surface 34 is shown in FIG. 4 either side of the road surface 32. The pavement surface 34 is artificially generated by the processor 10 to provide a surface appearance which resembles paving stones or slabs. The processor 10 associates an absolute position and a corresponding measured reflectance value with each pixel of the initial image of the section of the road surface 32 shown in FIG. 4. The measured reflectance values at each absolute position are represented as a grayscale image 160 in FIG. 5. The initial grayscale pixel intensity values corresponding to FIG. 4 are scaled or weighted by the processor 10 according to an increasing function of the measured reflectance values represented in FIG. 5 to provide the enhanced image 170 of the road surface section shown in FIG. 6. From FIG. 6, one skilled in the art, will appreciate that the processor 10 has effectively superimposed the real-world reflectance data on the initial image of the section of the road surface 32 artificially generated by the processor 10 to provide a more realistic image 170 of the road surface section.

Figure 7:
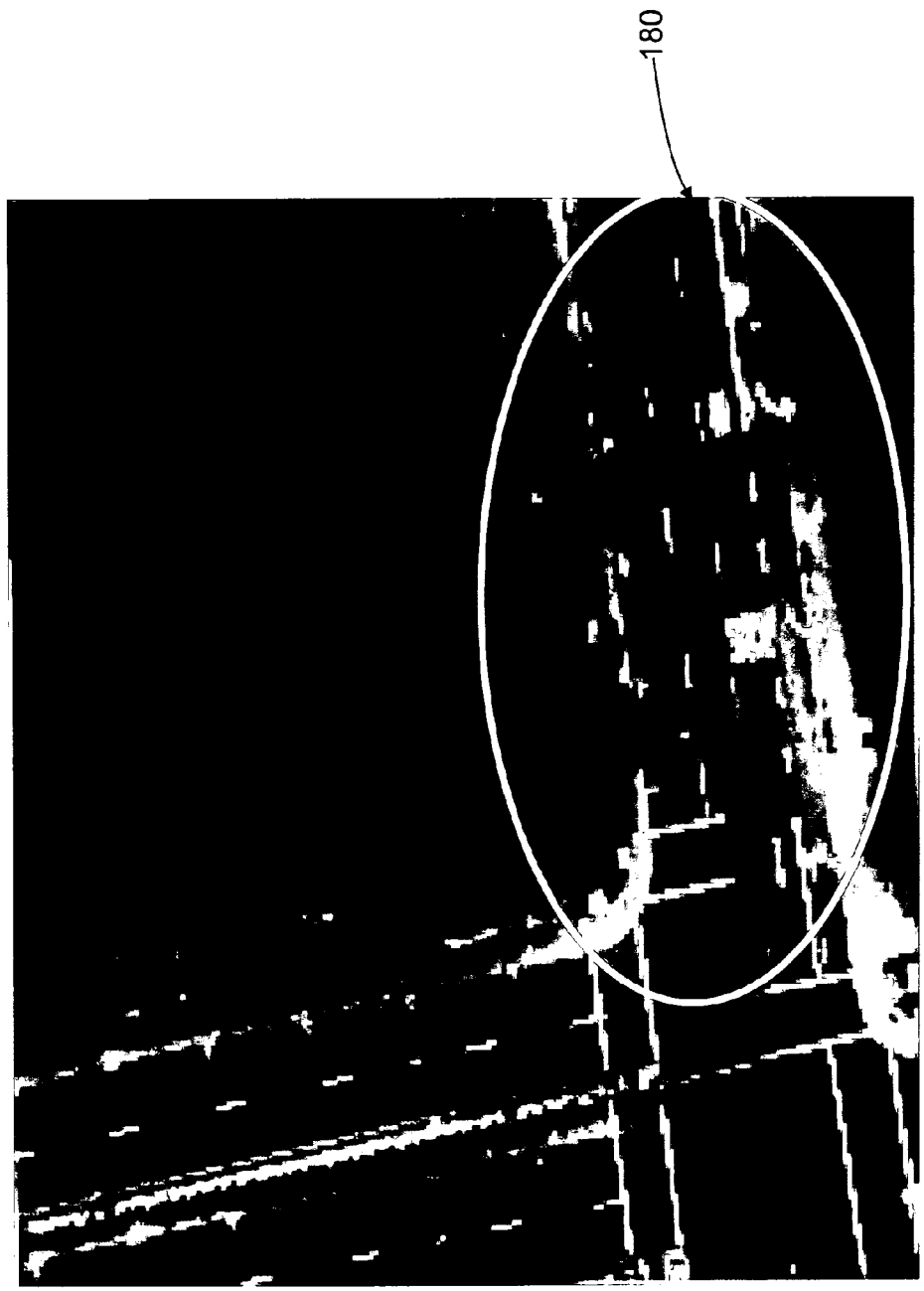
FIG. 7 is a spatially accurate representation of measured reflectance data of a further road section.
Figure 8:
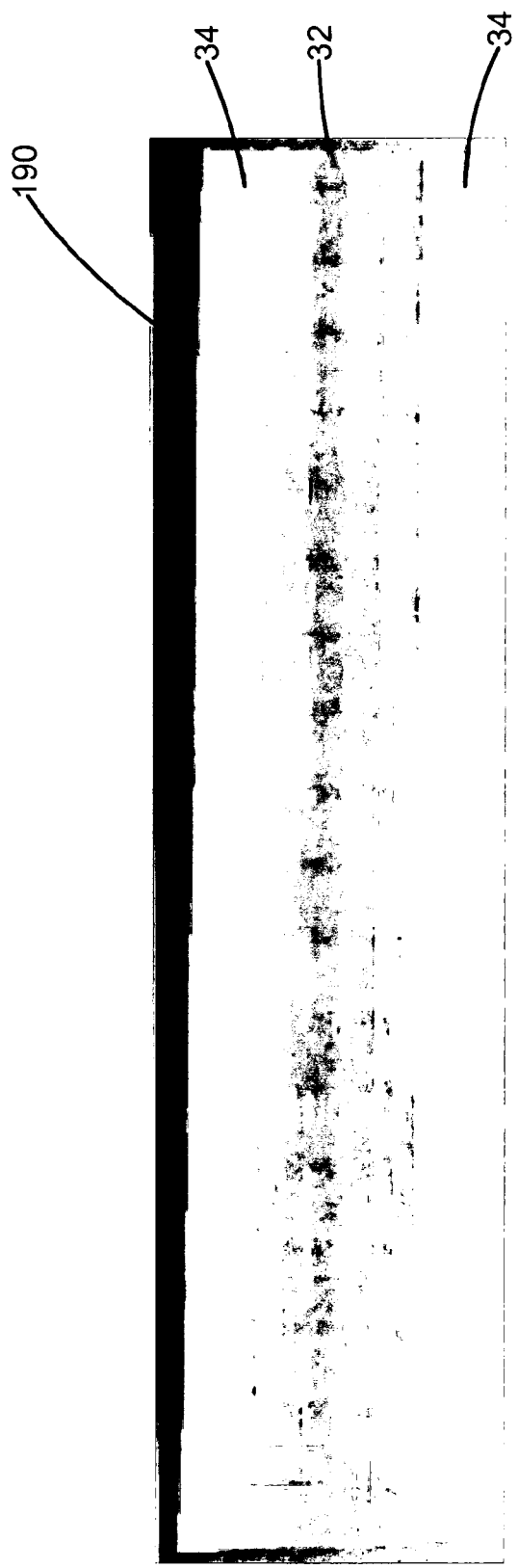
FIG. 8 shows a further road section image after adjustment according to the measured reflectance data of FIG. 7.

FIG. 7 shows a grayscale image representation 180 of measured reflectance data from a further section of the road surface 32. The initial grayscale pixel intensity values corresponding to FIG. 4 are scaled or weighted by the processor 10 according to an increasing function of the measured reflectance values represented in FIG. 7 to provide the enhanced image 190 of the further road surface section shown in FIG. 8.

Figure 9:
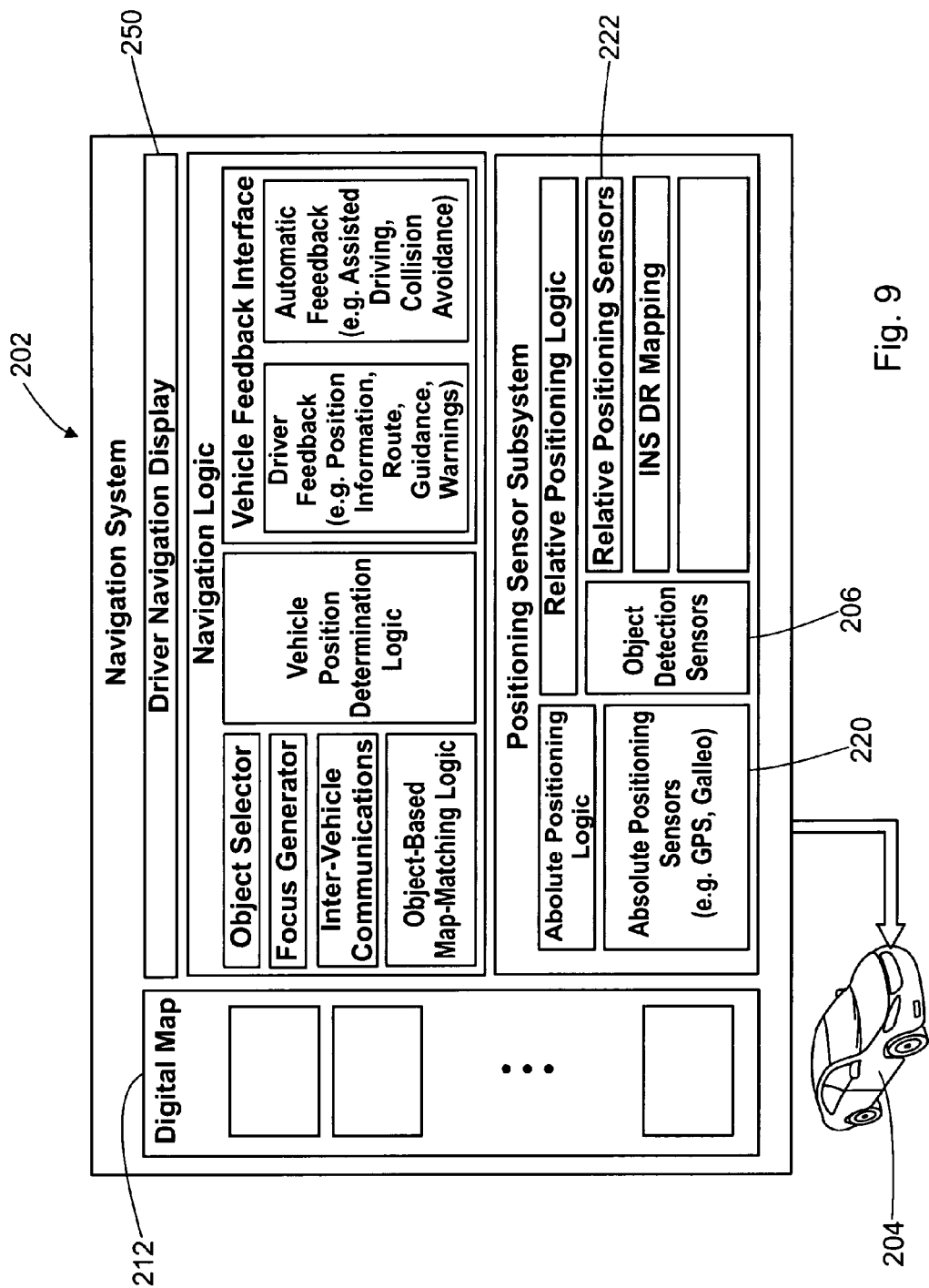
FIG. 9 is a schematic representation of a user navigation system.

Having generated an enhanced image of a road section as described above, data associated with such an enhanced image may be stored in a map database. For example, the enhanced image data may be stored in a map database and transferred to a navigation system or the enhanced image data may be stored in a map database of a navigation system such as a satellite navigation system. FIG. 9 shows a navigation system generally designated 202 having such a map database stored in a memory 212. Such a map database may provide navigational assistance to a user of a vehicle 204 in which the satellite navigation system 202 is located or to which the satellite navigation system 202 is attached. The satellite navigation system 202 of FIG. 9 shares many features with the mobile mapping system 2 of FIG. 1. Accordingly, like features in FIG. 9 have the same reference numerals as corresponding features in FIG. 1 incremented by "200". For example, the satellite navigation system 202 comprises absolute and relative positioning sensors 220 and 206 respectively. The satellite navigation system 202 also comprises object detection sensors 206 which may take the form of laser rangefinder scanners. The memory 212 contains the map database comprising enhanced image data for a plurality of road surface sections where the image data for each road surface section is generated according to the method described with reference to FIG. 3. In addition, the satellite navigation system 202 comprises a display 250 for displaying one or more of the enhanced images stored in the memory 212 according to an absolute position of a vehicle 204 as determined by the absolute and relative positioning sensors 220, 206.

One skilled in the art will appreciate that various modifications of the method of the present invention are possible without departing from the scope of the present invention. For example, rather than generating an initial image of the object and adjusting the grayscale intensity values for each pixel of the initial image according to a corresponding measured reflectance, the method may comprise forming an enhanced image directly by setting or defining a grayscale intensity value of each pixel according to a corresponding measured reflectance.

The mobile mapping system 2 shown in FIG. 1 may comprise a digital camera 40 mounted on the roof 8 of the survey vehicle 4. It will be appreciated that the camera 40 is shown at a position forward of the laser scanner 6 in FIG. 1 for clarity only and that, in reality, the camera 40 may be located at the rear of the roof 8 alongside the laser scanner 6 as shown in FIG. 2. The camera 40 may repeatedly capture images of the road surface 32 to provide a plurality of road surface images. The processor 10 time-stamps each road surface image and stores the road surface image in the memory 12 for post-processing. Instead of artificially generating the initial grayscale image of a section of the road surface 32 as described with reference to step 100 in FIG. 3, the initial grayscale image of the section of the road surface 32 may be constructed by first selecting a portion of a captured image of the section of the road surface 32 which is free of obstructions such as traffic and pedestrians and which is also free of road markings. The selected portion of the captured image of the section of the road surface 32 may then be tiled to provide the initial image of the section of the road surface 32. Such a method for constructing the initial grayscale image of a section of the road surface 32 may provide an even more realistic image of the section of the road surface 32 when combined with the further method step 106 described with reference to FIG. 3.

The mobile mapping system 2 may comprise a plurality of laser scanners. For example, the mobile mapping system 2 may comprise at least one rearward facing laser scanner and at least one forward facing laser scanner.

Similarly, the mobile mapping system 2 may comprise a plurality of cameras. For example, the mobile mapping system 2 may comprise at least one rearward facing camera and at least one forward facing camera.

Rather than adjusting, scaling or weighting the greyscale intensity values of each pixel of an image of a section of a road surface according to an increasing function of the measured reflectance values, the processor may employ a thresholding technique. For example, the processor 10 may set the greyscale intensity value of a pixel to a predetermined value if a corresponding measured reflectance value exceeds a predetermined threshold reflectance. Such a technique may serve to enhance the contrast with which road markings appear in the enhanced image.

Rather than adjusting, scaling or weighting the greyscale intensity values of each pixel of an image of a section of a road surface, the processor 10 may adjust one or more different attributes of the pixel of the image of the section of the road surface according to the measured reflectance. For example, the processor 10 may adjust at least one of a brightness, lightness, intensity, saturation, contrast and the like of the associated pixel of the image according to the measured reflectance.

Rather than adjusting, scaling or weighting an attribute value of each pixel of an image of a section of a road surface, the processor 10 may adjust one or more different attributes of a portion of the image of the section of the road surface. Such a portion may, for example, comprise a plurality of pixels.

Rather than storing and post-processing measurement data such as the measured reflectance data, the measured distance data and the measured position and orientation data, the processor 10 may process the measurement data in real-time and store only processed data in the memory 12.

Rather than being located in the survey vehicle 4, the processor 10 may be located remotely from the survey vehicle 4. In such an embodiment, the transceiver 14 may transmit unprocessed measurement data to such a remote processor for processing.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the described embodiments implement certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

Lastly, it should also be noted that whilst the accompanying claims set out particular combinations of features disclosed herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A method for use in forming an image of an object comprising:
    providing an initial image of an object, said object comprising a surface having a variation in appearance across the surface;
    obtaining, by a processor, data representing a measured reflectance from positions on the surface of the object;
    associating, by the processor, a pixel, point or portion of the initial image of the object with a corresponding position on the surface of the object from which the reflectance is measured; and
    setting, by the processor, a value of an attribute of the pixel, point or portion of the initial an image of the object according to the measured reflectance of the corresponding position on the surface of the object to form an enhanced image of the object.

2. A method according to claim 1, wherein the object comprises a surface for vehicular traffic.

3. A method according to claim 1, wherein the object comprises a road marking.

4. A method according to claim 1, wherein the object comprises a road-side surface or a road-side structure.

5. A method according to claim 1, wherein the attribute of the initial image of the object comprises at least one of a brightness, lightness, intensity, grayscale intensity, saturation, contrast, hue and colour of the image.

6. A method according to claim 1, comprising setting a value of an attribute of the initial image according to an increasing function of the measured reflectance.

7. A method according to claim 1, comprising comparing a measured reflectance value of the object to a predetermined threshold reflectance value and setting a value of an attribute of the initial image of the object according to whether the measured reflectance value is greater than, equal to or less than the predetermined threshold reflectance value.

8. A method according to claim 1, comprising at least one of measuring a reflectance of the object, measuring a distance to the object and determining a position and orientation of a device used to measure the distance to the object.

9. A method according to claim 1, comprising determining a position on a surface of the object from which the reflectance is measured.

10. A method according to claim 1, comprising artificially generating the initial image of the object according to a function of the object.

11. A method according to claim 1, comprising capturing an image of the object and constructing the initial image of the object from at least a portion of the captured image of the object.

12. A method for use in navigation comprising providing a navigation system with data associated with an image of an object, the image being formed by a method according to claim 1.

13. A method according to claim 12, comprising displaying the image of the object.

14. A method according to claim 12, comprising:
    providing the navigation system with a plurality of images, each image being formed by a method according to claim 1;
    determining the position of a user;
    selecting one or more of the plurality of images according to the determined position of the user; and
    displaying the one or more selected images.

15. An apparatus for use in forming an image of an object comprising: at least one processor configured to:
    provide an initial image of an object, said object comprising a surface having a variation in appearance across the surface;
    obtain data representing a measured reflectance from positions on the surface of the object;
    associate a pixel, point or portion of the initial image of the object with a corresponding position on the surface of the object from which the reflectance is measured; and
    set a value of an attribute of the pixel, point or portion of the initial image of the object according to the measured reflectance of the corresponding position on the surface of the object to form an enhanced image of the object.

16. A map database comprising:
    data associated with an image of an object, the image being formed by a method according to claim 1.

* * * * *